(12) United States Patent
Jacoby

(10) Patent No.: US 9,720,758 B2
(45) Date of Patent: *Aug. 1, 2017

(54) DIAGNOSTIC ANALYSIS TOOL FOR DISK STORAGE ENGINEERING AND TECHNICAL SUPPORT

(71) Applicant: Dell Products, LP, Round Rock, TX (US)

(72) Inventor: Robert B. Jacoby, Merrimack, NH (US)

(73) Assignee: Dell Products, LP, Round Rock, TX (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/087,745

(22) Filed: Nov. 22, 2013

(65) Prior Publication Data

US 2015/0074462 A1    Mar. 12, 2015

Related U.S. Application Data

(63) Continuation-in-part of application No. 14/065,825, filed on Oct. 29, 2013, now Pat. No. 9,317,349, which
(Continued)

(51) Int. Cl.
  *G06F 11/00*    (2006.01)
  *G06F 11/07*    (2006.01)
(Continued)

(52) U.S. Cl.
  CPC ........ *G06F 11/079* (2013.01); *G06F 11/0727* (2013.01); *G06F 11/3034* (2013.01);
(Continued)

(58) Field of Classification Search
  CPC .......................... G06F 11/0778; G06F 11/079
  See application file for complete search history.

(56) References Cited

U.S. PATENT DOCUMENTS 5,084,819 A    1/1992  Dewey et al.
5,828,583 A *  10/1998 Bush et al. .................. 702/185
(Continued)

FOREIGN PATENT DOCUMENTS

CN    101414273 B    8/2010

OTHER PUBLICATIONS

Pinheiro, E., et al., "Failure Trends in a Large Disk Drive Population," *Proceedings of the 5th USENIX Conference on File and Storage Technologies (FAST'07)*, (Feb. 2007).
(Continued)

*Primary Examiner* — Amine Riad
(74) *Attorney, Agent, or Firm* — Hamilton, Brook, Smith & Reynolds, P.C.

(57) ABSTRACT

The invention pertains to a method and information handling system (IHS) for reducing storage device vulnerability to degraded performance, data unavailability or data loss. An embodiment of the method of the present invention begins by storing debug data associated with at least one storage device and obtaining diagnostic data for the at least one storage device. Next, an analysis is performed using the obtained data and the stored debug data. Then, one or more issues and one or more action plans for resolution may be identified. Finally, a report is provided to one or more users including the one or more identified issues and the one or more action plans.

23 Claims, 8 Drawing Sheets

Related U.S. Application Data is a continuation-in-part of application No. 14/024,454, filed on Sep. 11, 2013.

(51) Int. Cl.
  *G06F 11/34* (2006.01)
  *G06F 11/30* (2006.01)

(52) U.S. Cl.
  CPC ...... *G06F 11/3058* (2013.01); *G06F 11/3485* (2013.01); *G06F 11/3409* (2013.01)

(56) References Cited

U.S. PATENT DOCUMENTS

| | | | |
|---|---|---|---|
| 5,917,724 A | 6/1999 | Brousseau et al. | |
| 6,148,335 A | 11/2000 | Haggard et al. | |
| 6,189,084 B1* | 2/2001 | Kurisu | 712/11 |
| 6,408,406 B1* | 6/2002 | Parris | G11B 20/182 714/41 |
| 6,415,189 B1* | 7/2002 | Hajji | G01M 13/045 324/662 |
| 6,434,714 B1 | 8/2002 | Lewis et al. | |
| 6,467,054 B1* | 10/2002 | Lenny | 714/42 |
| 6,771,440 B2* | 8/2004 | Smith | 360/31 |
| 6,845,306 B2 | 1/2005 | Henry et al. | |
| 6,912,676 B1 | 6/2005 | Gusler et al. | |
| 7,136,768 B1* | 11/2006 | Shah | G06F 11/008 702/115 |
| 7,200,588 B1* | 4/2007 | Srivastava | G06F 11/3636 |
| 7,236,911 B1* | 6/2007 | Gough et al. | 702/185 |
| 7,278,057 B2 | 10/2007 | Betancourt et al. | |
| 7,302,617 B2 | 11/2007 | Wookey | |
| 7,373,559 B2 | 5/2008 | Guha | |
| 7,409,582 B2 | 8/2008 | McNeill, Jr. et al. | |
| 7,434,097 B2* | 10/2008 | Guha et al. | 714/6.32 |
| 7,490,073 B1 | 2/2009 | Qureshi et al. | |
| 7,539,907 B1 | 5/2009 | Johnsen et al. | |
| 7,603,395 B1 | 10/2009 | Bingham et al. | |
| 7,653,563 B2 | 1/2010 | Veeningen et al. | |
| 7,676,445 B2 | 3/2010 | Fry et al. | |
| 7,765,190 B1 | 7/2010 | Bingham et al. | |
| 7,865,278 B2 | 1/2011 | Underdal et al. | |
| 7,877,645 B2 | 1/2011 | Meyer et al. | |
| 7,908,526 B2 | 3/2011 | Guha | |
| 8,005,709 B2 | 8/2011 | King et al. | |
| 8,015,201 B1* | 9/2011 | Harris | G06F 11/079 707/769 |
| 8,073,821 B2 | 12/2011 | Zahavi et al. | |
| 8,086,893 B1 | 12/2011 | MacFarland et al. | |
| 8,103,463 B2 | 1/2012 | Kalgren et al. | |
| 8,136,124 B2 | 3/2012 | Kosche et al. | |
| 8,185,784 B2 | 5/2012 | McCombs et al. | |
| 8,315,991 B2 | 11/2012 | Mandagere et al. | |
| 8,316,263 B1 | 11/2012 | Gough et al. | |
| 8,386,889 B1 | 2/2013 | Tang et al. | |
| 8,412,600 B2 | 4/2013 | Kim et al. | |
| 8,521,546 B2 | 8/2013 | Brown | |
| 8,760,780 B1 | 6/2014 | Brooker | |
| 8,782,491 B2 | 7/2014 | Resch et al. | |
| 8,812,342 B2 | 8/2014 | Barcelo et al. | |
| 8,856,927 B1 | 10/2014 | Beloussov et al. | |
| 8,862,948 B1 | 10/2014 | Lam | |
| 8,880,801 B1 | 11/2014 | Robins et al. | |
| 8,904,144 B1 | 12/2014 | Chelur | |
| 8,909,990 B2 | 12/2014 | Davis et al. | |
| 8,949,672 B1* | 2/2015 | Srihamat | G06F 11/366 714/38.1 |
| 8,949,863 B1* | 2/2015 | Coatney et al. | 719/327 |
| 8,972,799 B1 | 3/2015 | Brooker et al. | |
| 9,037,921 B1 | 5/2015 | Brooker et al. | |
| 9,084,937 B2 | 7/2015 | Gadher et al. | |
| 9,137,110 B1 | 9/2015 | Adogla et al. | |
| 9,189,309 B1 | 11/2015 | Ma et al. | |
| 9,317,349 B2 | 4/2016 | Jacoby et al. | |
| 9,396,200 B2 | 7/2016 | Jacoby et al. | |
| 9,436,411 B2 | 9/2016 | Arnold et al. | |
| 9,454,423 B2 | 9/2016 | Jacoby et al. | |
| 2002/0052718 A1 | 5/2002 | Little et al. | |
| 2002/0087950 A1* | 7/2002 | Brodeur | G06F 11/3636 717/124 |
| 2003/0112538 A1* | 6/2003 | Smith | G11B 20/1816 360/31 |
| 2003/0204788 A1 | 10/2003 | Smith | |
| 2004/0205403 A1* | 10/2004 | Markow | G11B 27/36 714/30 |
| 2004/0260967 A1 | 12/2004 | Guha et al. | |
| 2005/0265160 A1 | 12/2005 | Sasaki et al. | |
| 2006/0047715 A1 | 3/2006 | Parizeau | |
| 2006/0053338 A1* | 3/2006 | Cousins et al. | 714/6 |
| 2006/0075189 A1 | 4/2006 | Hood et al. | |
| 2006/0090098 A1 | 4/2006 | Le et al. | |
| 2006/0112135 A1* | 5/2006 | Warshawsky | G06F 11/3452 |
| 2007/0136389 A1 | 6/2007 | Bergant et al. | |
| 2007/0272751 A1 | 11/2007 | Tsurumi | |
| 2008/0059292 A1 | 3/2008 | Myers et al. | |
| 2008/0209274 A1* | 8/2008 | Nicholson et al. | 714/37 |
| 2009/0161243 A1 | 6/2009 | Sharma et al. | |
| 2009/0204852 A1 | 8/2009 | Diggs et al. | |
| 2009/0259749 A1 | 10/2009 | Barrett et al. | |
| 2009/0279673 A1 | 11/2009 | Maffre et al. | |
| 2010/0023867 A1 | 1/2010 | Coldiron et al. | |
| 2010/0030586 A1 | 2/2010 | Taylor et al. | |
| 2010/0050023 A1* | 2/2010 | Scarpelli | G06F 11/0709 714/46 |
| 2010/0324945 A1* | 12/2010 | Hessing | 705/4 |
| 2011/0106763 A1 | 5/2011 | Madan et al. | |
| 2011/0276836 A1* | 11/2011 | Kahana | G06F 11/0709 714/38.1 |
| 2012/0066030 A1 | 3/2012 | Limpert | |
| 2012/0102543 A1 | 4/2012 | Kohli et al. | |
| 2012/0136985 A1 | 5/2012 | Popescu et al. | |
| 2012/0179936 A1 | 7/2012 | Masser et al. | |
| 2013/0006701 A1 | 1/2013 | Guven et al. | |
| 2013/0059946 A1* | 3/2013 | Zhu et al. | 523/458 |
| 2013/0091499 A1 | 4/2013 | Soundararajan et al. | |
| 2013/0185602 A1* | 7/2013 | Jalaldeen | G06F 11/0778 714/48 |
| 2013/0212425 A1* | 8/2013 | Blaine | G06F 11/3648 714/6.1 |
| 2014/0019194 A1 | 1/2014 | Anne | |
| 2014/0040897 A1 | 2/2014 | Davis et al. | |
| 2014/0108855 A1 | 4/2014 | Gopakumar et al. | |
| 2014/0137257 A1 | 5/2014 | Martinez et al. | |
| 2014/0164290 A1 | 6/2014 | Salter | |
| 2014/0214354 A1 | 7/2014 | Dreifus et al. | |
| 2014/0244343 A1 | 8/2014 | Wilson et al. | |
| 2014/0244362 A1 | 8/2014 | Chaudhury | |
| 2014/0278730 A1 | 9/2014 | Muhart et al. | |
| 2014/0310714 A1 | 10/2014 | Chan et al. | |
| 2014/0358357 A1 | 12/2014 | Jones et al. | |
| 2015/0046756 A1 | 2/2015 | Sreekumaran et al. | |
| 2015/0052406 A1 | 2/2015 | Garrett et al. | |
| 2015/0067153 A1 | 3/2015 | Bhattacharyya et al. | |
| 2015/0074055 A1 | 3/2015 | Jacoby et al. | |
| 2015/0074452 A1 | 3/2015 | Tsukahara et al. | |
| 2015/0074463 A1 | 3/2015 | Jacoby et al. | |
| 2015/0074467 A1 | 3/2015 | Jacoby | |
| 2015/0074468 A1 | 3/2015 | Jacoby et al. | |
| 2015/0135033 A1 | 5/2015 | Ellis et al. | |
| 2015/0277804 A1 | 10/2015 | Arnold et al. | |
| 2016/0039291 A1 | 2/2016 | Reese et al. | |

OTHER PUBLICATIONS

Anderson, D., et al., "More than an interface—SCSI vs. ATA," *Proceedings of the 2nd Annual Conference on File and Storage Technology (FAST '03)*, pp. 1-13 (Mar. 2003).

Cole, G., "Estimating Drive Reliability in Desktop Computers and Consumer Electronics Systems," *Seagate Technology Paper TP-338.1*, pp. 1-8, (Nov. 2000).

(56) References Cited

OTHER PUBLICATIONS

Yang, J., et al., "A Comprehensive Review of Hard-Disk Drive Reliability," *Proceedings of the Annual Symposium on Reliability and Maintainability*, pp. 403-409 (Jan. 1999).
Hughes, G.F., et al., "Improved Disk-Drive Failure Warnings," *IEEE Transactions on Reliability*, 51(3): 350-357 (Sep. 2002).
Murray, J.F., et al., "Machine Learning Methods for Predicting Failures in Hard Drives: A Multiple-Instance Application," *J. Machine Learning Research*, 6: 783-816 (May 2005).
Wilcoxon, F., "Individual Comparison by Ranking Methods," *Biometrics Bulletin*, 1(6): 80-83 (1945); http://www.jstor.org, pp. 80-83 (Dec. 18, 2006).

\* cited by examiner

| Member Name | RAID Type | Free Space | Controller Type | Array Firmware | Model | Drive Firmware | Size | Type | Random Reads | Sequential Reads | Random Writes | Sequential Writes | Serial Number | Location | Usage | KB data transferred per disk/day | Disk modifier usage | Risk level |
|---|---|---|---|---|---|---|---|---|---|---|---|---|---|---|---|---|---|---|
| A | 50 | 46 | 11 | V5.2.2 | Model: MBF2300RC | PA03 | 279.4 GB | SAS | 3.8E+08 | 2.38E+08 | 1.01E+09 | 2.93E+08 | | | Normal usage | 72268321 | 72268321 | LOW |
| B | 5 | 36 | 7 | V5.2.1 | Model: ST310005 24NS | KD03 | 931.5 GB | SATA | 1978000 | 2847000 | 3637000 | 2.988E+06 | | | Normal usage | 81310538 | 40655269 0 | MODERATE |

FIG. 5A

| Y | 6 | 8 | 10 | V5.2.0 | Model: ST310005 24NS | KD03 | 931.5 GB | SATA | 8835000 | 7105000 | 2568000 | 2.973E+06 | | | Normal usage | 49098486 | 24549243 0 | LOW+ |
| Z | 50 | 33 | 4 | V5.0.8 | Model: ST340075 5SS | ERCA | 372.5 GB | SAS | 276 | 339 | 40 | 2 | | | Normal usage | 4632483 | 4632483 | HIGH |

| Member Name | Serial Number | Service Tag | Firmware | CM Type | RAID | Enclosure | Diag location | Disks reported | Master CEMI | Slave CEMI | CM0 Revision | CM1 Revision | Expander Firmware | IOCTL error |
|---|---|---|---|---|---|---|---|---|---|---|---|---|---|---|
| member1 | scrubbed | scrubbed | V5.0.2 (R138185) | 10 | 50 | SUMO | scrubbed | 16 | 8.2 | 8.2 | X04 | X04 | 3.07 | Yes |
| member2 | scrubbed | scrubbed | V5.2.2 (R229536) | 10 | 5 | SUMO | scrubbed | 16 | 8.2 | 8.2 | A03 | A03 | 3.07 | Yes |

FIG. 6A

| Member Name | Serial Number | Service Tag | Firmware | CM Type | RAID | Enclosure | Diag location | Disks reported | Master CEMI | Slave CEMI | CM0 Revision | CM1 Revision | Expander Firmware | IOCTL error |
|---|---|---|---|---|---|---|---|---|---|---|---|---|---|---|
| member7 | scrubbed | scrubbed | V6.0.1 (R264419) | 10 | 10 | SUMO | scrubbed | 0 | 8.2 | 8.2 | A03 | A03 | 3.07 | Yes |
| member8 | scrubbed | scrubbed | V6.0.4 (R322829) | 10 | 50 | SUMO | scrubbed | 16 | 8.2 | 8.2 | A03 | A03 | 3.07 | Yes |

| Member Name | Serial Number | Service Tag | Firmware | CM Type | CM0 Revision | CM1 Revision | RAID | Enclosure | Diag location | events from dmesg | events from syslog |
|---|---|---|---|---|---|---|---|---|---|---|---|
| member1 | scrubbed | scrubbed | V5.1.2 | 10 | A04 | A04 | 10 | RS1603 | scrubbed | 2 | 1 |
| member2 | scrubbed | scrubbed | V6.0.2 | 8 | R10 | R10 | 5 | RS1603 | scrubbed | 0 | 2 |
| . . . | | | | | | | | | | | |
| member5 | scrubbed | scrubbed | V5.2.5 | 7 | A03 | A03 | 5 | RS1603 | scrubbed | 2 | 1 |
| member6 | scrubbed | scrubbed | V5.1.1 (H2) | 12 | A03 | A03 | 50 | BLACK_PEARL | scrubbed | 0 | 1 |

| Member Name | Serial Number | Service Tag | Firmware | CM Type | RAID | Enclosure | Diag location | Available Mbufs | Used Mbufs | # of Replication Partners |
|---|---|---|---|---|---|---|---|---|---|---|
| member1 | scrubbed | scrubbed | V6.0.6 (R351932) | 7 | 6 | SUMO | scrubbed | 985 | 825 | 1 |
| member2 | scrubbed | scrubbed | V6.0.4 (R322829) | 7 | 10 | SUMO | scrubbed | 985 | 784 | 1 |

| member13 | scrubbed | scrubbed | V6.0.2 (R305616)(H2) | 11 | 6 | FLYING_DUTCHMAN | scrubbed | 985 | 666 | 1 |
| member14 | scrubbed | scrubbed | V6.0.2 (R287892) | 10 | 50 | RS1603 | scrubbed | 985 | 663 | 1 |

DIAGNOSTIC ANALYSIS TOOL FOR DISK STORAGE ENGINEERING AND TECHNICAL SUPPORT

RELATED APPLICATIONS

This application is a continuation-in-part of U.S. application Ser. No. 14/065,825 filed on Oct. 29, 2013, which is a continuation-in part of U.S. application Ser. No. 14/024,454 filed on Sep. 11, 2013. The entire teachings of the above applications are incorporated herein by reference.

BACKGROUND OF THE INVENTION

The increased use of technology and computers has generated a corresponding increase in digital data. This ever-increasing digital data requires a corresponding ever-increasing amount of storage space.

The need for storage space for digital data has been fueled through many changes in society. For example, home computer users increased storage of multimedia data, especially video and photographic data, has served to increase the amount of storage space needed. Likewise, industry also requires increased storage space. As more and more business is being conducted electronically, there has been an ever-increasing demand and need for the storage of this vast amount of business data. Furthermore, there has been a demand to digitize the storage of once paper files in an attempt to decrease the overhead cost of this paper generation and storage.

With this increase of digital data, there has been a corresponding further reliance upon the integrity and required accessibility of the digital data. While storage device reliability has increased, these devices have not become infallible.

SUMMARY OF THE INVENTION

Thus, an efficient and reliable method for reducing storage device vulnerability to degraded performance, data unavailability or data loss is presented. The present invention is directed to a method and corresponding apparatus for reducing storage device vulnerability to degraded performance, data unavailability (DU) and/or data loss (DL). An embodiment of the method of the present invention begins by storing debug data associated with at least one storage device. Next, data is obtained for the at least one storage device and an analysis is performed including the obtained data and the stored debug data. Further the method identifies one or more issues and one or more action plans for resolution, based upon the analysis. Finally the method provides a report to one or more users including the one or more identified issues and the one or more action plans.

In an embodiment of the method of the present invention, the obtained data includes device configuration information. The obtained data comprises data including at least one of the following: storage array data, processor utilization, cache and memory utilization, disk reliability data, hardware or environmental information, or firmware version information. In another embodiment of the method of the present invention, the obtained data includes diagnostic logfile data based upon one or more hardware or software characteristics of the at least one storage device. In yet another embodiment, the stored debug data includes at least one of the following: known bug footprint, known hardware issue, known environmental problem, known software issue, known network problem, or known configuration problem.

In another embodiment of the method of the present invention, one or more issues include one or more potential issues. In a further embodiment, the analysis includes at least one of the following: hardware analysis, software panic analysis, root cause analysis, or performance analysis.

In yet another embodiment of the method of the present invention, the obtained data includes at least one the following: a hardware characteristic, software characteristic, configuration characteristic, environmental characteristic, or network characteristic. The one or more identified issues include an issue with at least one of the following: a hardware component, hardware module, hardware configuration, hardware interconnect, environmental condition, configuration condition, firmware, firmware version, software configuration, memory, disk space, network connectivity, network configuration, load balancing, performance characteristics, host side (the host side lies outside of the storage array and general issues are identified with the host side), or storage array configuration. The one or more action plans include an action plan to correct or update at least one of the following: a hardware component, hardware module, hardware configuration, hardware interconnect, environmental condition, configuration condition, firmware, firmware version, software configuration, memory, disk space, network connectivity, network configuration, load balancing, performance characteristics, host side, or storage array configuration.

In another embodiment of the method of the present invention, the analysis includes a hardware analysis. For the hardware analysis, obtained data includes at least one hardware or software characteristic. Based upon the hardware analysis, one or more issues may be identified including an issue with at least one of the following: a hardware component, hardware module, hardware interconnect, or firmware version. Based upon the hardware analysis, one or more action plans include an action plan to update or correct at least one of the following: a hardware component, hardware module, hardware interconnect, or firmware version.

In another embodiment of the method of the present invention, the analysis includes a software panic analysis. For the software panic analysis, data is obtained that includes at least one of the following: core dump file, memory dump, or stack trace. Based upon the panic analysis, one or more issues may be identified including an issue with at least one of the following: hardware component, hardware module, firmware, or firmware version. Based upon the panic analysis, one or more action plans may be identified including an action plan to update or correct at least one of the following: hardware component, hardware module, firmware, or firmware version.

In a further embodiment of the method of the present invention, the analysis includes a root cause analysis. For the root cause analysis, data is obtained that includes at least one of the following: hardware characteristic, software characteristic including firmware version, environmental characteristic, configuration characteristic, network characteristic including network connectivity information, network group information, or network group lead information. Based upon the root cause analysis, one or more issues may be identified including an issue with at least one of the following: hardware component, hardware module, hardware configuration, firmware version, software configuration, memory, network connectivity, network configuration, environmental condition, configuration condition, or storage array configuration. Based upon the root cause analysis, one or more action plans may be identified including an action plan to update or correct at least one of the following: hardware component, hardware module, hardware configuration, firmware version, software configuration, memory, network connectivity, network configuration, environmental condition, configuration condition, or storage array configuration.

In a further embodiment of the method of the present invention, the analysis includes a performance analysis. For the performance analysis, data is obtained that includes at least one of the following: hardware, software, or network characteristic. A network characteristic may include at least one of the following: flow control information, write speed, read speed, latency, input size, output size, number of faults, number of retransmits, number of packet errors, transaction frequency, cache utilization, input/output (IO) wait state data, or network throughput. The performance analysis may identify one or more issues including an issue with at least one of the following: hardware component, hardware module, hardware interconnect, environmental condition, firmware, firmware version, memory, disk space, network connectivity, network configuration, load balancing, performance characteristics, host side, or storage array configuration. The performance analysis may also identify one or more action plans including an action plan to update or correct at least one of the following: hardware component, hardware module, hardware interconnect, environmental condition, firmware, firmware version, memory, disk space, network connectivity, network configuration, load balancing, performance characteristics, host side, or storage array configuration.

In another embodiment of the method of the present invention, the storage device comprises two or more storage devices. The method includes storing debug data associated with the two or more storage devices. The method also includes obtaining data for the two or more storage devices. The method further includes performing an analysis including the obtained data and the stored debug data for the two or more storage devices. The method also includes identifying one or more issues and one or more action plans for resolution based upon the analysis. In addition, the method includes providing a report to one or more users of the one or more identified issues and the one or more action plans.

A further embodiment of the present invention is directed to an Information Handling System (IHS). An embodiment of the IHS comprises a data module configured to store debug data associated with at least one storage device, the data module configured to obtain data for the at least one storage device. The IHS may further comprise a computing module configured to perform an analysis including the obtained data and the stored debug data, the computing module configured to identify one or more issues and one or more action plans for resolution based upon the analysis. The IHS may further comprise a display module configured to provide a report to one or more users including the one or more identified issues and the one or more action plans.

According to an embodiment of the IHS, the obtained data may include device configuration information. The obtained data may comprise data of at least one of: storage array data, processor utilization, cache and memory utilization, disk reliability data, or firmware version information. According to another embodiment of the IHS, the obtained data may include diagnostic logfile data based upon one or more hardware or software characteristics of the at least one storage device.

According to another embodiment of the IHS, the stored debug data may include at least one of: known bug footprint, known hardware issue, known environmental problem, known software issue, known network problem, or known configuration problem. In a further embodiment of the IHS, the one or more issues may include one or more potential issues. In a further embodiment of the IHS, the analysis may include at least one of: hardware analysis, software panic analysis, root cause analysis, or performance analysis.

In another embodiment of the IHS, the obtained data may include at least one hardware characteristic, software characteristic, configuration characteristic, environmental characteristic, or network characteristic. The one or more identified issues may include an issue with at least one of the following: a hardware component, hardware module, hardware configuration, hardware interconnect, environmental condition, configuration condition, firmware, firmware version, software configuration, memory, disk space, network connectivity, network configuration, load balancing, performance characteristics, host side, or storage array configuration. The one or more action plans may include an action plan to correct or update at least one of the following: a hardware component, hardware module, hardware configuration, hardware interconnect, environmental condition, configuration condition, firmware, firmware version, software configuration, memory, disk space, network connectivity, network configuration, load balancing, performance characteristics, host side, or storage array configuration.

In yet another embodiment of the IHS, the analysis may include a hardware analysis, wherein the obtained data includes at least one hardware or software characteristic. The one or more identified issues may include an issue with at least one of the following: a hardware component, hardware module, hardware interconnect, or firmware version. The one or more action plans may include an action plan to update or correct at least one of the following: a hardware component, hardware module, hardware interconnect, or firmware version.

In a further embodiment of the IHS, the analysis may include a software panic analysis, wherein the obtained data includes at least one of the following: core dump file, memory dump, or stack trace. The one or more identified issues may include an issue with at least one of the following: hardware component, hardware module, firmware, or firmware version. The one or more action plans may include an action plan to update or correct at least one of the following: hardware component, hardware module, firmware, or firmware version.

In another embodiment of the IHS, the analysis may include a root cause analysis, wherein the obtained data includes at least one of the following: hardware characteristic, software characteristic including firmware version, environmental characteristic, configuration characteristic, network characteristic including network connectivity information, network group information, or network group lead information. The one or more identified issues may include an issue with at least one of the following: a hardware component, hardware module, hardware configuration, firmware version, software configuration, memory, network connectivity, network configuration, environmental condition, configuration condition, or storage array configuration. The one or more action plans may include an action plan to update or correct at least one of: a hardware component, hardware module, hardware configuration, firmware version, software configuration, memory, network connectivity, network configuration, environmental condition, configuration condition, or storage array configuration.

In a further embodiment of the IHS, the analysis may include a performance analysis, wherein the obtained data includes at least one hardware, software, or network characteristic. The network characteristic may include at least one of: flow control information, write speed, read speed, latency, input size, output size, number of faults, number of retransmits, number of packet errors, transaction frequency, cache utilization, input/output (IO) wait state data, or network throughput. The one or more identified issues may include an issue with at least one of the following: a hardware component, hardware module, hardware interconnect, environmental condition, firmware, firmware version, memory, disk space, network connectivity, network configuration, load balancing, performance characteristics, host side, or storage array configuration. The one or more action plans may include an action plan to update or correct at least one of the following: a hardware component, hardware module, hardware interconnect, environmental condition, firmware, firmware version, memory, disk space, network connectivity, network configuration, load balancing, performance characteristics, host side, or storage array configuration.

In another embodiment of the IHS, the storage device may comprise two or more storage devices. The IHS may include a data module, computing module, and display module. The data module may be configured to store debug data associated with the two or more storage devices. The data module may be configured to obtain data for the two or more storage devices. The computing module may be configured to perform an analysis including the obtained data and the stored debug data. The computing module may be configured to identify one or more issues and one or more action plans for resolution based upon the analysis. The display module may be configured to provide a report to one or more users including the one or more identified issues and the one or more action plans.

An alternative embodiment of the present invention is directed to a non-transitory computer readable medium having stored thereon a sequence of instructions which, when loaded and executed by a processor coupled to an apparatus, causes the apparatus to: store debug data associated with at least one storage device, obtain data for the at least one storage device, perform an analysis including the obtained data and the stored debug data, identify one or more issues and one or more action plans for resolution based upon the analysis, and provide a report to one or more users including the one or more identified issues and the one or more action plans.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5, FIGS. 5A-5B depicts a database entry of data that may be used in an embodiment of the present invention.

FIG. 6, FIGS. 6A-6B depicts another database entry of data that may be used in an embodiment of the present invention.

FIG. 7, FIGS. 7A-7B depicts a further database entry of data that may be used in an embodiment of the present invention.

FIG. 8, FIGS. 8A-8B depicts yet another database entry of data that may be used in an embodiment of the present invention.

DETAILED DESCRIPTION OF THE INVENTION

Figure 1:
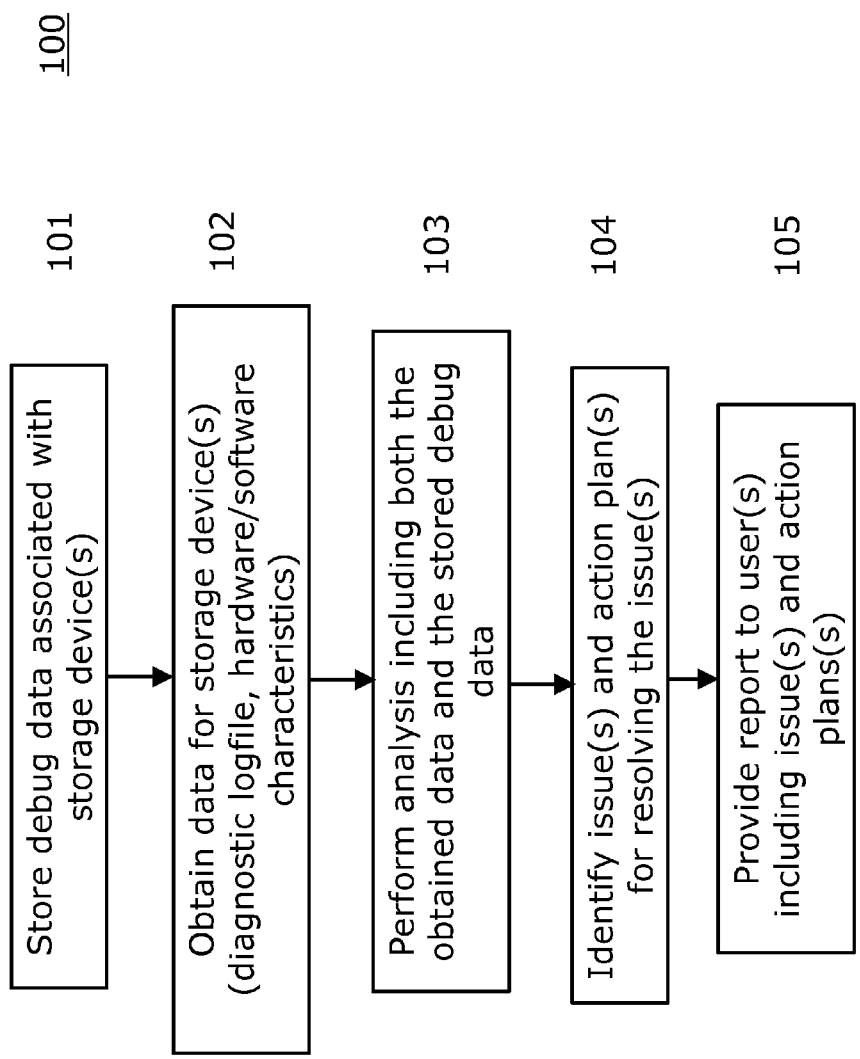
FIG. 1 is a flowchart of a method of reducing storage device vulnerability to degraded performance, data unavailability or data loss, according to an embodiment of the invention.

A description of example embodiments of the invention follows.

With the increased use of storage devices, there is also an increased potential for storage device failure, or reduction in performance of the storage devices. When a storage device fails or is suspected as encountering a performance issue, an extensive diagnostic logfile may be produced for a support engineer to review. These diagnostic logfiles/reports may be obtained during support calls, and provide a historical record of a condition that a specific array has been in during the support calls. This logfile may include thousands of pages of text to be reviewed by the technician. Using prior approaches, support engineers manually review such logfiles, in order to triage and root cause problems (or potential problems) related to a storage device.

When manually reviewing such logfiles, debug/failure analysis is often not straightforward. Although a storage device may be replaceable, replacement of the storage device may not fix the problem. Many types of problems may occur, such as hardware issues, software issues, network issues, environmental issues, configuration issues, or other issues. A storage device problem may merely be a symptom of a greater problem which is indirectly related to the storage device. An expedient and efficient analysis is required in order to get to the root of the problem, before it recurs.

In addition, the manual review of logfiles may be time-consuming and costly to the support engineer and his company and also to a demanding customer who is expecting an expedient solution. A customer may be eager to obtain an expedient and definitive analysis of the reason for failure, in order to maximize performance of existing storage devices that may be degraded. Therefore, there is a need for an automated solution that provides a quick and efficient triage and analysis of storage device performance issues and failures.

The present invention provides such an automated solution. The present invention provides a tool/mechanism to automate the review process and provides reporting for the technician to use. The present invention searches historical data (including customer diagnostics) for specific trigger events (bug footprints), and reports configuration and statistical data that enables the support engineering team to triage and resolve issues. The present invention reviews this historical data, looking for specific issues, including issues that were unknown at the time that the original diagnostic logfiles were obtained. The present invention analyzes stored debug data, such as, but not limited to, specific hardware and/or software footprints, and compares this stored debug data against the diagnostic logfile, using a set of criteria/rules. The tool/mechanism of the present invention may cross reference numerous bug footprints, including hardware issues, issues with firmware or Redundant Array of Independent Disk (RAID) types, and other known problems. After cross referencing, the tool/method of the present invention provides support with a detailed report of issues identified and action plans for resolution.

This greatly enhances support's ability to respond quickly to meet (or exceed) the needs of a customer. In addition, given its automated nature, the present invention catches issues and potential issues that a support engineer may miss. The present invention may automatically run when the support team unpacks a customer's diagnostic report. Furthermore, since it is not time-consuming, the present invention may be run proactively, in order to proactively determine if issues may exist and further optimize performance of a customer's system. Therefore, a support engineer may detect and resolve problems even in the absence of a customer reporting an issue.

FIG. 1 is a flow diagram of a method 100 of reducing storage device vulnerability to degraded performance, data unavailability or data loss, according to the principles of the present invention. The method 100 begins by storing debug data associated with at least one storage device (101). Next, data is obtained for the storage device(s) (102). Next, an analysis is performed (103) for the storage device(s) based on the obtained data and the stored debug data. Next, the present invention identifies one or more issues and action plans for resolving the one or more issues (104). Then, a report is provided to one or more users that includes the identified issues and action plans (105). The one or more users preferably include a support user, support technician, or support engineer, but is not so limited, and may include a customer user, or any other type of user.

The method 100 begins by storing debug data associated with at least one storage device (101). The stored debug data may include known bug footprints, known hardware issues, known environmental problems, known software issues, known network problems, or known configuration problems. The stored debug data may include both existing and potential issues. The stored debug data may be stored as a result of current or previous diagnostic logfiles. The stored debug data may be obtained from one data library, and stored to another data library.

The method proceeds to obtain data for the one or more storage devices (102). The obtained data may include customer reports, historical logfiles, or diagnostic logfiles obtained by the support team that are based upon one or more hardware or software characteristics of storage device(s). The obtained data may include device configuration information pertinent to a storage array. In such an embodiment, the obtained data may include Redundant Array of Independent Disk (RAID) data, processor utilization, cache and memory utilization, disk reliability data, hardware information or environmental condition/information, and/or firmware version information.

The RAID data may comprise RAID type, a number of RAID sets, a number of disks per RAID set, a total number of disks, a number of spare disks, storage device size, storage device speed, and/or storage device class, or other factors. The disk reliability data (also known as a drive quality modifier, or field data) may comprise the storage device class, storage device size, storage device speed, storage device model, and/or storage device usage. The hardware or environmental condition/information may include, but is not limited to, configuration (or status) information including enable/disable, speed, current, resistance, voltage, warning/alert indications, indications from watchdog/keepalive circuitry, or other parameters relevant to hardware such as fans, power supplies, temperature sensors, humidity sensors, pressure sensors, or other devices. The environmental condition/information may also include electromagnetic interference information and/or electromagnetic interference detection information. The firmware information may comprise version information of the disk drive and disk array.

According to an example embodiment, the obtained data may further include information related to the interface type of the storage device. The storage device class may include interface types as are known in the art, including SATA (Serial Advance Technology Attachment), PATA (Parallel ATA), SCSI (Small Computer System Interface), and/or SAS (Serial Attached SCSI) interfaces. The storage device usage may comprise usage amount, usage type, amount of power on hours, amount of sequential usage, amount of random access usage, a number of reads, a number of writes, a grown defect list, a read error rate, a size of one or more reads, and a size of one or more writes. Further, an embodiment of the present invention may obtain any combination of obtained data as described herein.

While example embodiments of the method 100 are described hereinabove as using a number of read or writes, this number may be any number which may be derived from the obtained data of the storage device. For example, an average number of reads and writes may be used. Further still, all of the aforementioned obtained data may be pre, or post processed, such that the obtained data is not pure, raw, but may be, for example, an average. Yet further still, embodiments of the method 100 may obtain any combination of any of the obtained data of the storage device and device configuration information as described herein or as known in the art.

The data (collectively, the obtained data in step 102 and/or the stored debug data in step 101) may be obtained from any source that is known in the art. For example, in an embodiment wherein the method 100 is being carried out on a computer system, the data may be obtained from any point that is communicatively coupled to the computer system. For example, the data may be communicated to an apparatus performing the method 100 via a local area network (LAN) and/or a wide area network (WAN). Yet further still, in an example embodiment of the method 100, wherein the method 100 is being carried out on a computing device, the data may be obtained by loading the data directly on the computing device. Alternatively, the data may be obtained from any storage device that is known in the art that is communicatively coupled to the computing device carrying out the method 100. In an alternative embodiment of the method 100 that is operating in a computer network environment, such as a server/client environment, the data may be obtained by the server running the method 100 from a communicatively coupled client computer. Further, in such an environment, an embodiment may be carried out on a client computer and the data may be obtained from a communicatively coupled client, server, or any combination thereof.

After obtaining data (102), the method 100 next performs an analysis for the at least one storage device (103) based on the obtained data. As mentioned hereinabove, the obtained data may comprise hardware or software characteristics. The method uses the obtained data, the stored debug data, and performs an analysis using a set of rules/algorithm, for the purpose of detecting issues (or potential issues). The analysis may identify an issue (104) with one or more of the following: a hardware component, hardware module, hardware configuration, hardware interconnect, environmental condition, firmware, firmware version, software configuration, memory (where memory includes but is not limited to cache memory, hard disk memory, or other types of volatile or non-volatile memory), disk space, network connectivity, network configuration, load balancing, performance characteristics, host side (the host side lies outside of the storage array), or storage array configuration. The analysis may also determine an action plan (104) associated with the identified issue. For a non-limiting example, a hardware component may include an integrated circuit or other electrical component and a hardware module may include a printed circuit board, a chassis module, card, or channel card.

In step 103, different types of analysis may be performed. The analysis types may include, but are not limited to, a general/comprehensive analysis, hardware analysis, software panic analysis, root cause analysis or performance analysis, or other types of analysis. A user may select any combination of types of analysis, or create a custom type of analysis.

The analysis in step 103 may include a hardware analysis. In the hardware analysis, the obtained data may include at least one hardware or software characteristic. The one or more identified issues may include an issue with at least one of: hardware component, hardware module, hardware interconnect, or firmware version. The one or more action plans in step 104 may include an action plan to update or correct at least one of: hardware component, hardware module, hardware interconnect, or firmware version.

The specific rules/algorithms used by the hardware analysis may include checking that the hardware or software characteristics are valid within a predefined range/threshold. For a non-limiting example, the hardware analysis may check that a measured voltage is within a range of plus ten percent to minus ten percent of an expected voltage value. For a non-limiting example, a hardware analysis may monitor fans, temperature, voltage, chassis and slot numbers, fan speeds, and battery quality. In obtaining data, control and/or status registers may be read from, in order to determine voltage values, or other physical characteristics. The hardware analysis may analyze physical characteristics of the system against expected specification values. In addition, the hardware analysis may check against known bugs/problems and report if any of the obtained data falls outside of expected ranges, indicating a potential known bug/problem.

Hardware analysis/tests may also check for component failures including but not limited to: drive faults, error correcting code (ECC) memory errors, hardware faults (including semiconductors/integrated circuits, and/or other hardware), software component faults, control module failures, channel card faults, elastic internet protocol (EIP) failures, operation panel faults, power supply failures, fan failures, battery failures (including different types of batteries, depending on the model of the storage device/array).

The analysis in step 103 may include a panic analysis. In the panic analysis, the obtained data may include at least one of: core dump file, memory dump, or stack trace. The one or more identified issues in step 104 may include an issue with at least one of: hardware component, hardware module, firmware, or firmware version. The one or more action plans in step 104 may include an action plan to update or correct at least one of: hardware component, hardware module, firmware, or firmware version.

For non-limiting example, in panic analysis, if a software error occurs, obtained data such as a core/dump file may be produced. The panic analysis analyzes the stack trace and core dump files. The specific rules/algorithms employed by the panic analysis may include interpreting obtained data such as the stack trace, memory address, relevant procedure, exception address, or other characteristics, and comparing the obtained data against a table of known bugs/issues for associated stored debug data. The panic analysis then identifies the cause of the fault to the one or more users, including suspect hardware, firmware, or other conditions.

The analysis in step 103 may include a root cause analysis. For the root cause analysis, the obtained data may include at least one of: hardware characteristic, software characteristic including firmware version, environmental characteristic, configuration characteristic, network characteristic including network connectivity information, network group information, or network group lead information. The one or more issues identified by the root cause analysis in step 104 may include an issue with at least one of: hardware component, hardware module, hardware configuration, firmware version, software configuration, memory, network connectivity, network configuration, environmental condition, configuration condition, or storage array configuration. The root cause analysis may identify one or more action plans in step 104 including an action plan to update, replace, or correct at least one of: hardware component, hardware module, hardware configuration, firmware version, software configuration, memory, network connectivity, network configuration, environmental condition, configuration condition, or storage array configuration.

For non-limiting example, a root cause analysis may detect a loss of network group information, thereby determining that a split group is present in the network. For non-limiting example, a root cause analysis may a detect bogus/invalid media access control (MAC) address, a transmission control protocol (TCP) excessive embryonic connection, connection rate, non-authentic drives, or unsupported drives.

For non-limiting example, group information may include configuration information such as address information, setup information, volume information, information for groups of storage arrays within a group pool, information related to moving one member (or storage array) from one pool to another, group volume setup information, and internet protocol (IP) address information. For non-limiting example, group lead information may include information regarding who is lead in a cluster (for each update), and/or who is a lead in a cluster as changes occur from one node to the next (or one storage device to the next).

For non-limiting example, the rules/algorithms used for the root cause analysis may include checking whether each element of the obtained data is in a respective set threshold or not. The root cause analysis may also set minimum or maximum limits for parameters of the obtained data for use in the check. Threshold checks may include, but are not limited to, comparing actual usage to published supported thresholds for the number of volumes, number of snapshots, number of connections per pool, maximum temperature, network error rate, and other such parameters.

The analysis in step 103 may also include a performance analysis. The obtained data may include at least one hardware, software, or network characteristic that includes at least one of: flow control information, write speed, read speed, latency, input size, output size, number of faults, number of retransmits, number of packet errors, transaction frequency, cache utilization, input/output (IO) wait state data, or network throughput. In step 104, the performance analysis may identify one or more issues including an issue with at least one of: hardware component, hardware module, hardware interconnect, environmental condition, firmware, firmware version, memory, disk space, network connectivity, network configuration, load balancing, performance characteristics, host side (the host side lies outside of the storage array), or storage array configuration. In step 104, the performance analysis may identify one or more action plans including an action plan to update or correct at least one of: hardware component, hardware module, hardware interconnect, environmental condition, firmware, firmware version, memory, disk space, network connectivity, network configuration, load balancing, performance characteristics, host side, or storage array configuration. The rules/algorithms of the performance analysis may include checking that each element of obtained data is within a respective range, by comparison with the stored debug data.

In a non-limiting example, a performance analysis may detect a high number of retransmits and thereby detect that flow control is disabled. The performance analysis may then identify an action plan to turn on flow control.

One skilled in the art realizes that the non-limiting examples, and example embodiments may perform the analysis (hardware analysis, panic analysis, root cause analysis, and performance analysis) using additional rules/algorithms. In general, one rule/algorithm that may be used in analysis is checking that each element of obtained data is within a respective range, in order to determine whether an issue (or potential issue) is present. The rule/algorithm may also compare the obtained data with the stored debug data, in order to determine whether an issue (or potential issue) is present.

After analysis is completed, a report is produced. In step 105, the method 100 provides a report to one or more users that includes any identified issues and associated action plans for resolving the issues. This report may be provided in a series of text files, each of which identifies a specific issue. One skilled in the art realizes that this report may also be provided through a graphical user interface, or other means. The report may indicate failure indicators and warning indicators for specific characteristics, and the report provides an action plan for resolving the issues that may be identified.

In one embodiment, the method 100 may be considered as an integrated diagnostic toolkit. For one storage device, several issues may be identified. However, the present invention is not limited to one storage device, and more than one storage device may be used.

Figure 2:
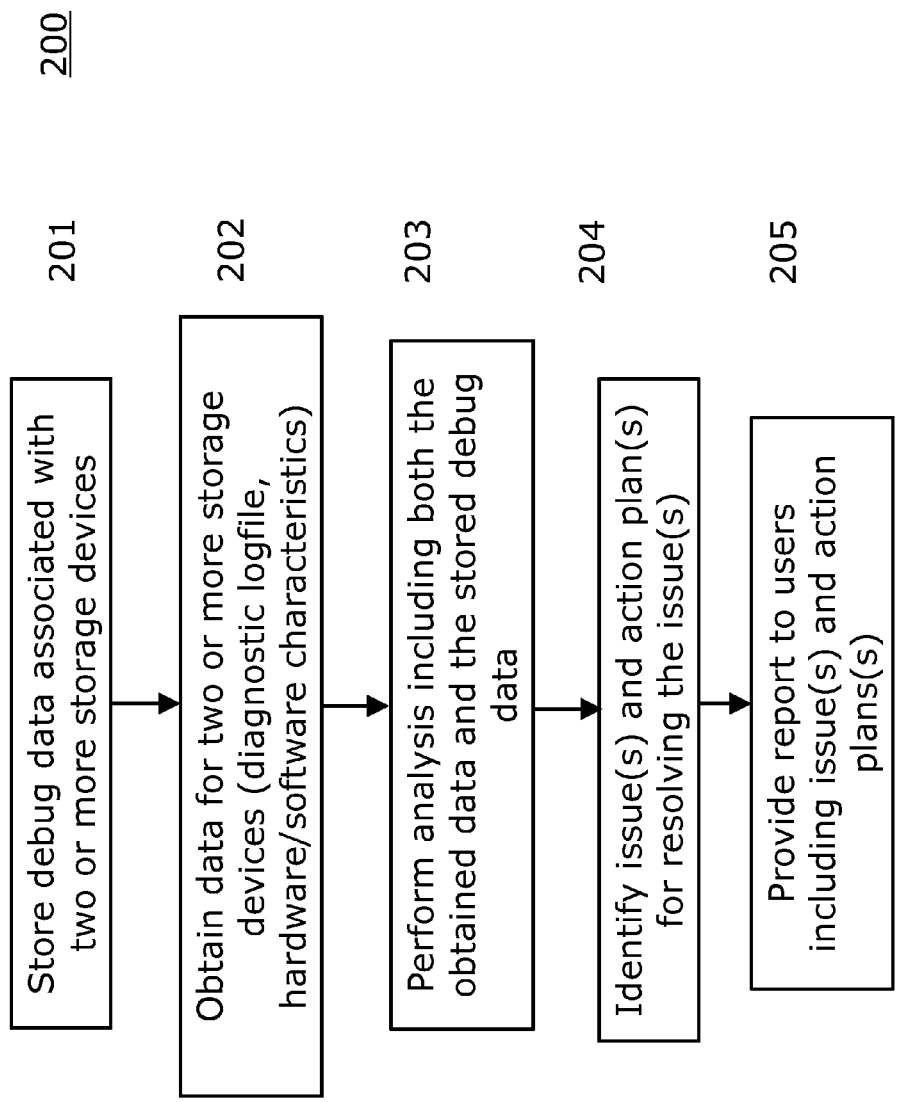
FIG. 2 is a flowchart of a method of reducing storage device vulnerability to degraded performance, data unavailability or data loss, according to an embodiment of the invention, for two or more storage devices.

In an alternative embodiment, the method of the present invention may be performed for two or more storage devices (200). FIG. 2 is a flow diagram of a method 200 using two or more storage devices of reducing storage devices' vulnerability to degraded performance, data unavailability or data loss, according to the principles of the present invention. The method 200 begins by storing debug data associated with multiple storage devices (201). Next, data is obtained for the storage devices (202). Next, an analysis is performed (203) for the storage devices based on the obtained data and the stored debug data. Next, the present invention identifies one or more issues and action plans for resolving the one or more issues (204). Then, a report is provided to one or more users that includes the identified issues and action plans (205).

In yet another embodiment, the method 200 may be considered as a data mining tool. For several storage devices, at several customers, one type of issue may be identified. However, the present invention is not limited to identifying one type of issue, and multiple issues or types of issues may be identified. For a non-limiting example, a data mining method/tool 200 may obtain data from a very large sample size of storage devices (for example, 150,000 storage devices) and identify one type of issue that is affecting many of these storage devices.

Figure 3:
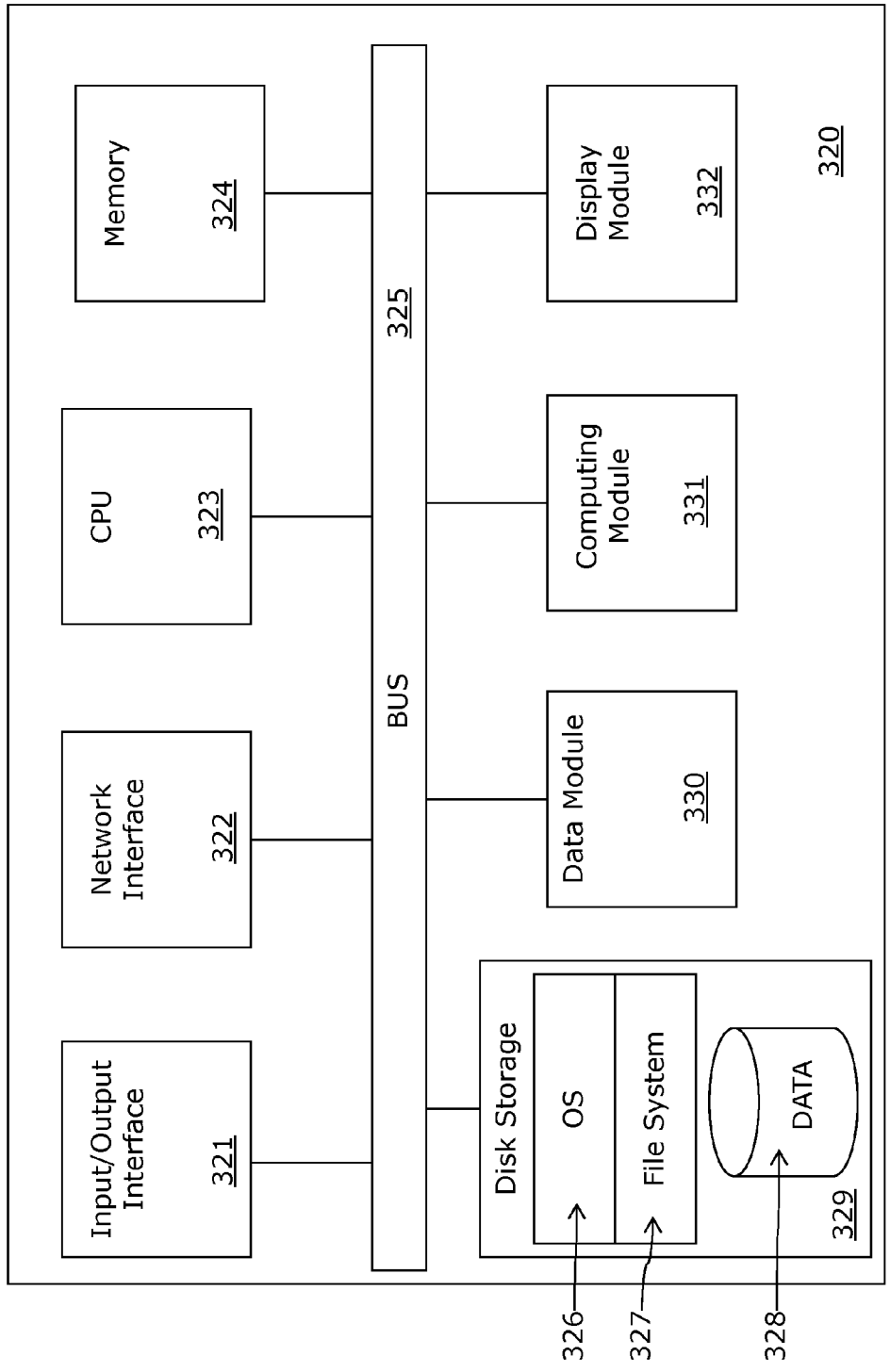
FIG. 3 is a simplified block diagram of an Information Handling System (IHS) configured to reduce storage device vulnerability to degraded performance, data unavailability or data loss.

FIG. 3 is a high level block diagram of an information handling system (IHS) 320 that is configured to assess storage device vulnerability to degraded performance, data unavailability or data loss. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS 320. Further connected to the bus 325 is a network interface 322 for connecting the IHS 320 to the various networks that are known in the art. A Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Coupled with the OS 326, is the file system 327. Disk storage 329 may be any storage device known in the art.

The IHS 320 further comprises a data module 330. According to an embodiment of the IHS 320, the data module 330 is configured to store debug data of at least one storage device. The data module is further configured to obtain diagnostic data for the at least one storage device. The obtained data and/or the stored debug data of the data module 330 may be any data as described herein. The data module 330 may retrieve the data from any communicatively coupled source. For example, the data module 330 may retrieve the data from the storage device 329 or via the input/output interface 321 or network interface 322.

Communicatively coupled to the data module 330 is the computing module 331. The computing module 331 is configured to perform an analysis for the at least one storage device based on the obtained data from the data module 330 and the stored debug data and rules/algorithms of the present invention. The rules/algorithms may be obtained from any communicatively coupled source, including, but not limited to, the computing module 331, the network 322, from the input/output interface 321, the memory 324, or from disk storage 329. The computing module 331 is further configured to identify one or more issues and one or more corresponding action plans for resolution based upon the performed analysis. The IHS 320 further comprises a display module 332. The display module 332 is configured to provide a report to one or more users including any identified issues or action plans.

The IHS 320 and its various components and modules work in conjunction to reduce storage device vulnerability to degraded performance, data unavailability, or data loss. According to an example operation of the IHS 320, the data module 330 obtains data and retrieves stored debug data for at least one storage device, such as a storage device communicatively coupled to the IHS 320 via the network interface 322. Next, the computing module 331 performs an analysis and identifies issues and action plans for resolution. Finally, the display module 332 reports the identified issues and action plans to one or more users.

While the various components of the IHS 320 are illustrated in FIG. 3, embodiments of the IHS 320 are not so limited, and as is known in the art, components and modules of the IHS 320 may be connected in a variety of ways, including embodiments wherein one or more components are remotely located. It should be understood by a person of ordinary skill in the art that the IHS 320 may be implemented in various forms. The respective components and modules of the IHS 320 may be combined in any manner that is known in the art and may be implemented in any combination of hardware and software. For example, the above-described components and modules may be executable instructions in memory 324 or OS 326 operated on by CPU 323. Further, the IHS 320 and its various components and modules may be configured to operate in a manner corresponding to the above described methods 100 and 200 described herein above in relation to FIGS. 1 and 2 and its various embodiments.

Further, the IHS 320 and its various modules may be configured to perform any of the various methods described hereinabove. For example, in an embodiment of the IHS 320, the computing module 331 is configured to perform an analysis through at least one of: hardware analysis, software panic analysis, root cause analysis, or performance analysis. In another example embodiment of the IHS 320, the data module 330 is configured to obtain diagnostic logfile data based upon one or more hardware or software characteristics of the at least one storage device. In yet another embodiment of the IHS 320, the data module 330 is configured to store debug data that includes a known bug footprint, known hardware issue, known software issue, or known configuration problem.

Further embodiments of the IHS 320 may be configured to reduce storage device vulnerability to degraded performance, data unavailability or data loss for two or more storage devices. In such an embodiment, the data module 330 is configured to store debug data associated with each storage device and obtain respective data for each storage device. The computing module 331 is configured to perform an analysis including the obtained data and stored debug data and identify issues and action plans for resolution. The display module 332 may be further configured to provide a report/display including the identified issues and action plans for each storage device to one or more users.

Figure 4:
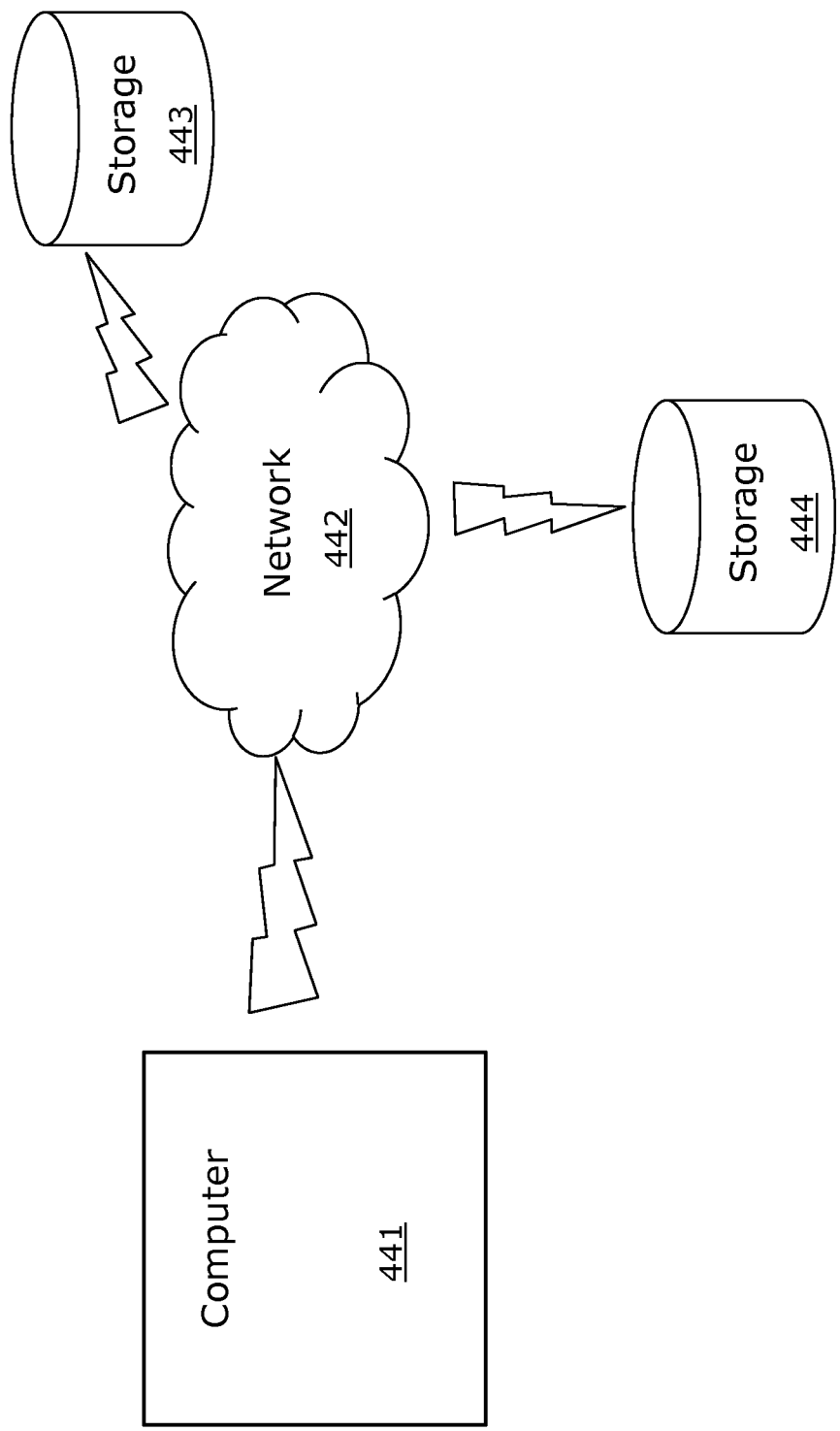
FIG. 4 depicts a computer network environment in which an embodiment of the present invention may be implemented.

FIG. 4 illustrates a computer network environment 440 in which the present invention may be implemented. The computer 441 and the storage devices 443 and 444 are linked through network 442. The computer 441 and the storage devices 443 and 444 may be connected through any network as is known in the art, including a wide area network (WAN) or local area network (LAN). The computer 441 may embody the IHS 320 and/or any embodiment of the IHS described herein. Similarly, the computer 441 may be configured to carry out any method or embodiment thereof described herein. According to an embodiment of the invention, the computer 441 is configured to reduce vulnerability of the storage device 443 and 444 to degraded performance, data unavailability or data loss. While only two storage devices are depicted, 443 and 444, the computer network environment 440 may comprise any number of storage devices.

FIG. 5, FIGS. 5A-5B, is a non-limiting example 550 of obtained data (and/or stored debug data) that may be used in an embodiment of the present invention. The data of FIG. 5, FIGS. 5A-5*b* may comprise a database, a data set, and/or one or more data file(s). The row 551 of the data 550 is a non-limiting example of some of the types of data that may comprise the data obtained, for example, in step 102 (and/or debug data stored, for example in step 101) of the method 100 as described hereinabove in relation to FIG. 1. Further, the row 551 may also comprise diagnostic logfile data that may be obtained in step 202 of the method 200. The column 552 may be populated after completing any embodiment of the invention described herein.

FIG. 6, FIGS. 6A-6B depicts another database entry of data (obtained data and/or stored debug data) that may be used in an embodiment of the present invention, where the database comprises data, a data set, and/or one or more data files. The row 651 of the data 650 is a non-limiting example of some of the types of data that may comprise the data obtained, for example, in step 102 (and/or debug data stored, for example in step 101) of the method 100 as described hereinabove in relation to FIG. 1. Further, the row 651 may also comprise diagnostic logfile data that may be obtained in step 202 of the method 200. The column 652 may be populated after completing any embodiment of the invention described herein.

FIG. 7, FIGS. 7A-7B depicts a further database entry of data (obtained data and/or stored debug data) that may be used in an embodiment of the present invention. The row 751 of the data 750 is a non-limiting example of some of the types of data that may comprise the data obtained, for example, in step 102 (and/or debug data stored, for example in step 101) of the method 100 as described hereinabove in relation to FIG. 1. Further, the row 751 may also comprise diagnostic logfile data that may be obtained in step 202 of the method 200. The column 752 may be populated after completing any embodiment of the invention described herein.

FIG. 8, FIGS. 8A-8B depicts yet another database entry of data (obtained data and/or stored debug data) that may be used in an embodiment of the present invention. The row 851 of the data 850 is a non-limiting example of some of the types of data that may comprise the data obtained, for example, in step 102 (and/or debug data stored, for example in step 101) of the method 100 as described hereinabove in relation to FIG. 1. Further, the row 851 may also comprise diagnostic logfile data that may be obtained in step 202 of the method 200. The column 852 may be populated after completing any embodiment of the invention described herein.

As shown in FIGS. 5-8, data (obtained data and/or stored debug data) may include, but is not limited to, member name, member type, Redundant Array of Independent Disk (RAID) type, free space, controller type, array firmware, model, drive firmware, size, type, number of random reads, number of random writes, number of sequential writes, serial number, location, usage, amount of data transferred per disk per day, disk modifier usage, or risk level. The data (obtained data and/or stored debug data) may further include a service tag, control module (CM) type, enclosure, diagnostic location, number of disks reported, master common enclosure management interface (CEMI, a CEMI being part of an operating system for a particular component), slave CEMI, CM revision, expander firmware, events from "dmesg" and/or "syslog" (commands well known in the art from Linux, Unix, or other operating systems), available memory buffers (Mbufs), used Mbufs, and number of replication partners.

It should be understood that the example embodiments described above may be implemented in many different ways. In some instances, the various methods and machines described herein may be implemented by a physical, virtual or hybrid general-purpose computer, or a computer network environment such as the computer network environment 440. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

An advantage of the present invention is that it directly relates to customer satisfaction as it dramatically reduces time to resolution and improves accuracy of diagnosis. The present invention reduces technical support costs by reducing the number of work hours spent in reviewing the diagnostic files. By one estimate, the present invention, in its practical use, has already saved approximately one hundred hours of support engineering time per day and thousands of hours of support engineering time in its total use.

Another advantage of the present invention is that it helps to improve overall product quality by allowing engineering to proactively find and fix issues that may not have been reported by customers.

While this invention has been particularly shown and described with references to example embodiments thereof, it will be understood by those skilled in the art that various changes in form and details may be made therein without departing from the scope of the invention encompassed by the appended claims.

What is claimed is:

1. A method for reducing storage device vulnerability to degraded performance, data unavailability or data loss, the method comprising:
   by a processor configured to execute computer code instructions stored in a memory:
   storing debug data associated with at least one storage device;
   obtaining data for the at least one storage device;
   performing an analysis including the obtained data, the stored debug data, and a software panic analysis;
   proactively identifying one or more issues and one or more proactive action plans for resolution based upon the analysis; and
   providing a report to one or more users including the one or more proactively identified issues and the one or more proactive action plans;
   wherein the obtained data includes a stack trace and zero or more of: a core dump file or a memory dump,
   wherein the one or more proactively identified issues include an issue with load balancing and hardware interconnect,
   and the obtained data further includes: a) device configuration information, b) data of cache and memory utilization, and c) at least one hardware, software, or network characteristic that includes at least one of flow control information and number of retransmits.

2. The method of claim 1 wherein the obtained data further comprises data of at least one of:
   Redundant Array of Independent Disk (RAID) data;
   processor utilization;
   disk reliability data;
   hardware information or environmental information; or
   firmware version information.

3. The method of claim 1 wherein the obtained data further includes diagnostic log file data based upon one or more hardware or software characteristics of the at least one storage device.

4. The method of claim 1 wherein the stored debug data includes a known bug footprint and at least one of: a known hardware issue, a known environmental problem, a known software issue, a known network problem, or a known configuration problem.

5. The method of claim 1 wherein the one or more issues include any of one or more potential issues, and one or more warnings.

6. The method of claim 1 wherein:
   the obtained data further includes at least one hardware characteristic, software characteristic, environmental characteristic, configuration characteristic, or network characteristic;
   the one or more proactively identified issues further include one or more issues with one or more of: hardware component, hardware module, hardware configuration, environmental condition, configuration condition, firmware, firmware version, software configuration, memory, disk space, network connectivity, network configuration, performance characteristics, host side, or storage array configuration; and
   the one or more proactive action plans include an action plan to correct or update at least one of: hardware component, hardware module, hardware configuration, hardware interconnect, environmental condition, configuration condition, firmware, firmware version, software configuration, memory, disk space, network connectivity, network configuration, load balancing, performance characteristics, host side, or storage array configuration.

7. The method of claim 1 wherein the analysis includes a hardware analysis, wherein:
   the obtained data further includes at least one hardware or software characteristic;
   the one or more proactively identified issues further include one or more issues with one or more of: hardware component, hardware module or firmware version; and
   the one or more proactive action plans include an action plan to update or correct hardware interconnect and zero or more of: hardware component, hardware module or firmware version.

8. The method of claim 1 wherein the one or more proactively identified issues include an issue with firmware and at least one of: a hardware component, a hardware module, or a firmware version; and
the one or more proactive action plans include an action plan to update or correct at least one of: hardware component, hardware module, firmware, or firmware version.

9. The method of claim 1 wherein the analysis includes a root cause analysis, wherein:
the obtained data further includes network group lead information and zero or more of: hardware characteristic, software characteristic including firmware version, environmental characteristic, configuration characteristic, network characteristic including network connectivity information, or network group information;
the one or more proactively identified issues further include one or more issues with at least one of: hardware component, hardware module, hardware configuration, firmware version, software configuration, memory, network connectivity, network configuration, environmental condition, configuration condition, or storage array configuration; and
the one or more proactive action plans include an action plan to update or correct at least one of: hardware component, hardware module, hardware configuration, firmware version, software configuration, memory, network connectivity, network configuration, environmental condition, configuration condition, or storage array configuration.

10. The method of claim 1 wherein the analysis includes a performance analysis, wherein:
the obtained data further includes at least another hardware, software, or network characteristic that includes at least one of: write speed, read speed, latency, input size, output size, number of faults, number of packet errors, transaction frequency, cache utilization, input/output (TO) wait state data, or network throughput;
the one or more proactively identified issues further include one or more issues with at least one of: hardware component, hardware module, environmental condition, firmware, firmware version, memory, disk space, network connectivity, network configuration, performance characteristics, host side, or storage array configuration; and
the one or more proactive action plans include an action plan to update or correct at least one of: hardware component, hardware module, hardware interconnect, environmental condition, firmware, firmware version, memory, disk space, network connectivity, network configuration, load balancing, performance characteristics, host side, or storage array configuration.

11. The method of claim 1 wherein the storage device comprises two or more storage devices and the method for each of the two or more storage devices comprises:
storing debug data associated with the two or more storage devices;
obtaining data for the two or more storage devices;
performing an analysis including the obtained data and the stored debug data for the two or more storage devices;
proactively identifying one or more issues and one or more proactive action plans for resolution based upon the analysis; and
providing a report to one or more users of the one or more proactively identified issues and the one or more proactive action plans.

12. An Information Handling System (IHS) comprising:
a processor; and
a memory with computer code instructions stored thereon, the memory operatively coupled to the processor such that the computer code instructions cause the processor to implement:
a data module configured to store debug data associated with at least one storage device;
the data module configured to obtain data for the at least one storage device;
a computing module configured to perform an analysis including the obtained data, the stored debug data, and a software panic analysis;
the computing module configured to proactively identify one or more issues and one or more proactive action plans for resolution based upon the analysis; and
a display module configured to provide a report to one or more users including the one or more proactively identified issues and the one or more proactive action plans;
wherein the obtained data includes a stack trace and zero or more of: a core dump file or a memory dump,
wherein the one or more proactively identified issues include an issue with load balancing and hardware interconnect,
and the obtained data further includes: a) device configuration information, b) data of cache and memory utilization, and c) at least one hardware, software, or network characteristic that includes at least one of flow control information and number of retransmits.

13. The IHS of claim 12 wherein the obtained data further comprises data of at least one of:
Redundant Array of Independent Disk (RAID) data;
processor utilization;
disk reliability data;
hardware information or environmental information; or
firmware version information.

14. The IHS of claim 12 wherein the obtained data further includes diagnostic logfile data based upon one or more hardware or software characteristics of the at least one storage device.

15. The IHS of claim 12 wherein the stored debug data includes a known bug footprint and at least one of: a known hardware issue, a known environmental problem, a known software issue, a known network problem, or a known configuration problem.

16. The IHS of claim 12 wherein the one or more issues include any of one or more potential issues, and one or more warnings.

17. The IHS of claim 12 wherein:
the obtained data further includes at least one hardware characteristic, software characteristic, environmental characteristic, configuration characteristic, or network characteristic;
the one or more proactively identified issues further include one or more issues with one or more of: hardware component, hardware module, hardware configuration, environmental condition, configuration condition, firmware, firmware version, software configuration, memory, disk space, network connectivity, network configuration, performance characteristics, host side, or storage array configuration; and
the one or more proactive action plans include an action plan to correct or update at least one of: hardware component, hardware module, hardware configuration, hardware interconnect, environmental condition, configuration condition, firmware, firmware version, software configuration, memory, disk space, network connectivity, network configuration, load balancing, performance characteristics, host side, or storage array configuration.

18. The IHS of claim 12 wherein the analysis includes a hardware analysis, wherein:
the obtained data further includes at least one hardware or software characteristic;
the one or more proactively identified issues further include one or more issues with one or more of: hardware component, hardware module or firmware version; and
the one or more proactive action plans include an action plan to update or correct hardware interconnect and zero or more of: hardware component, hardware module or firmware version.

19. The IHS of claim 12 wherein the one or more proactively identified issues include an issue with firmware and at least one of: a hardware component, a hardware module, or a firmware version; and
the one or more proactive action plans include an action plan to update or correct at least one of: hardware component, hardware module, firmware, or firmware version.

20. The IHS of claim 12 wherein the analysis includes a root cause analysis, wherein:
the obtained data further includes network group lead information and zero or more of: hardware characteristic, software characteristic including firmware version, environmental characteristic, configuration characteristic, network characteristic including network connectivity information, or network group information;
the one or more proactively identified issues further include one or more issues with at least one of: hardware component, hardware module, hardware configuration, firmware version, software configuration, memory, network connectivity, network configuration, environmental condition, configuration condition, or storage array configuration; and
the one or more proactive action plans include an action plan to update or correct at least one of: hardware component, hardware module, hardware configuration, firmware version, software configuration, memory, network connectivity, network configuration, environmental condition, configuration condition, or storage array configuration.

21. The IHS of claim 12 wherein the analysis includes a performance analysis, wherein:
the obtained data further includes at least another hardware, software, or network characteristic that includes at least one of: write speed, read speed, latency, input size, output size, number of faults, number of packet errors, transaction frequency, cache utilization, input/output (TO) wait state data, or network throughput;
the one or more proactively identified issues include one or more issues with at least one of: hardware component, hardware module, environmental condition, firmware, firmware version, memory, disk space, network connectivity, network configuration performance characteristics, host side, or storage array configuration; and
the one or more proactive action plans include an action plan to update or correct at least one of: hardware component, hardware module, hardware interconnect, environmental condition, firmware, firmware version, memory, disk space, network connectivity, network configuration, load balancing, performance characteristics, host side, or storage array configuration.

22. The IHS of claim 12 wherein the storage device comprises two or more storage devices, the IHS comprising:
a data module configured to store debug data associated with the two or more storage devices;
the data module configured to obtain data for the two or more storage devices;
a computing module configured to perform an analysis including the obtained data and the stored debug data;
the computing module configured to proactively identify one or more issues and one or more proactive action plans for resolution based upon the analysis; and
a display module configured to provide a report to a user including the one or more proactively identified issues and the one or more proactive action plans.

23. A non-transitory computer readable medium having stored thereon a sequence of instructions which, when loaded and executed by a processor coupled to an apparatus, causes the apparatus to:
store debug data associated with at least one storage device;
obtain data for the at least one storage device;
perform an analysis including the obtained data, the stored debug data, and a software panic analysis;
proactively identify one or more issues and one or more proactive action plans for resolution based upon the analysis; and
provide a report to one or more users including the one or more proactively identified issues and the one or more proactive action plans, wherein the obtained data includes a stack trace and zero or more of: a core dump file or a memory dump,
wherein the one or more proactively identified issues include an issue with load balancing and hardware interconnect,
and the obtained data further includes: a) device configuration information, b) data of cache and memory utilization, and c) at least one hardware, software, or network characteristic that includes at least one of flow control information and number of retransmits.

* * * * *